(12) United States Patent
Pohlmann et al.

(10) Patent No.: US 6,880,529 B2
(45) Date of Patent: Apr. 19, 2005

(54) POSITIONING ELEMENT

(75) Inventors: Jens Pohlmann, Schwieberdingen (DE); Stefan Lauter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,638

(22) PCT Filed: Aug. 14, 2002

(86) PCT No.: PCT/DE02/02973
§ 371 (c)(1),
(2), (4) Date: Apr. 17, 2003

(87) PCT Pub. No.: WO03/018998
PCT Pub. Date: Mar. 6, 2003

(65) Prior Publication Data
US 2004/0011334 A1 Jan. 22, 2004

(30) Foreign Application Priority Data
Aug. 20, 2001 (DE) .......................................... 101 40 794

(51) Int. Cl.⁷ ............................................ F02M 33/04
(52) U.S. Cl. ..................................................... 123/470
(58) Field of Search .......................................... 123/470

(56) References Cited

U.S. PATENT DOCUMENTS 6,325,049 B1 * 12/2001 Nally .......................... 123/470

FOREIGN PATENT DOCUMENTS

| EP | 1 001 161 | 5/2000 |
| JP | 831 25 03 | 11/1996 |
| WO | WO 00/36295 | 6/2000 |
| WO | WO 02/075147 | 9/2002 |

* cited by examiner

Primary Examiner—Thomas Moulis
(74) Attorney, Agent, or Firm—Kenyon & Kenyon

(57) ABSTRACT

An alignment element for securing a fuel injector, for the direct injection of fuel into the combustion chamber of an internal combustion engine, to a cylinder head of the internal combustion engine in a manner to ensure locking against rotation includes a ring that is slipped onto the fuel injector, provided on the ring is at least one plug that is arranged on the ring, slipped onto the fuel injector, in such a manner that it is able to snap into a recess in a plastic coating of the fuel injector.

10 Claims, 1 Drawing Sheet

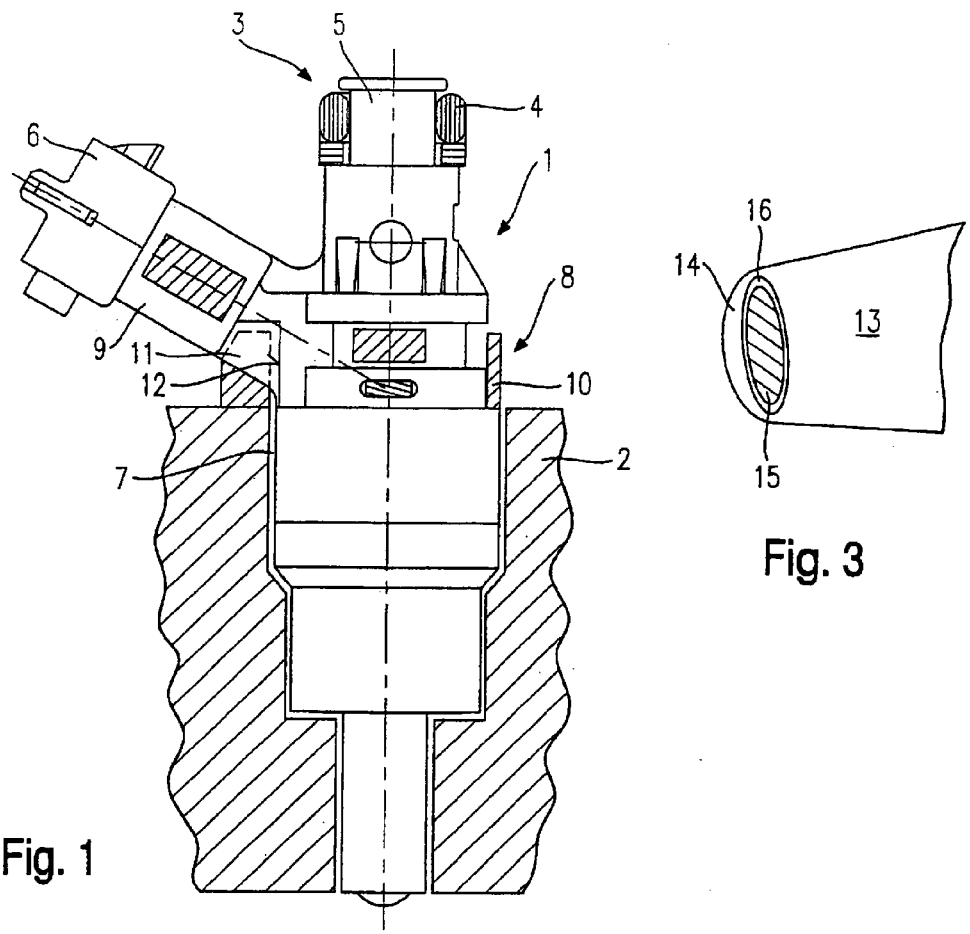
Fig. 1
Fig. 3
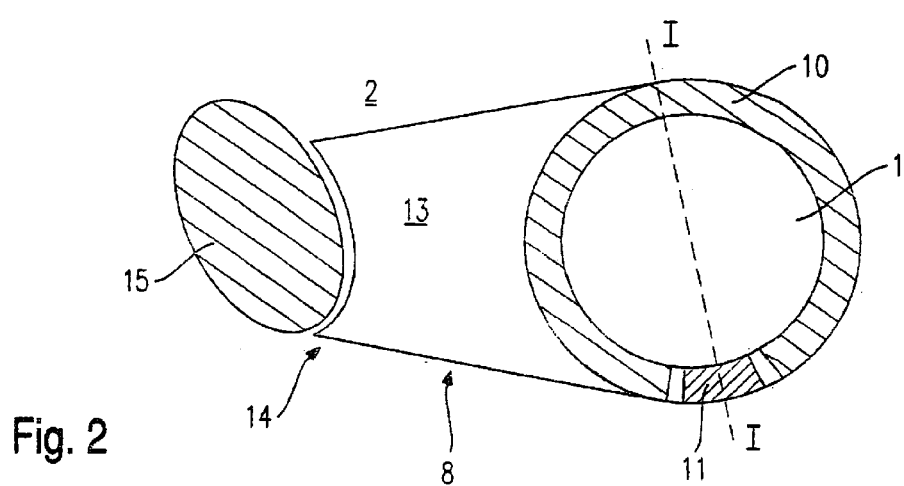
Fig. 2

POSITIONING ELEMENT

FIELD OF THE INVENTION

The present invention relates to an alignment element for locking a fuel injector, mounted in a cylinder head of an internal combustion engine, against rotation.

BACKGROUND INFORMATION

Fuel injectors for the direct injection of fuel into the combustion chamber of a mixture-compressing internal combustion engine having externally supplied ignition may be held down in the cylinder head by a clamping shoe that is bolted to the cylinder head of the internal combustion engine. Such a clamping shoe is discussed, for example, in Japanese Patent Application No. 831 25 03. In that case, the clamping shoe presses on a shoulder of the fuel injector and thereby is secures it in the receiving bore hole of the cylinder head. The clamping shoe is tightened so securely by a suitable tool, e.g., a torque wrench, that the fuel injector may not be I forced out of the cylinder head by the pressure prevailing in the combustion chamber of the internal combustion engine.

The fixing device discussed in Japanese Patent Application No. 831 25 03 may not provide protection for the fuel injector, held down by the fixing device, against rotation in the cylinder head. Due to the vibrations occurring during operation of the internal combustion engine, the fuel injector may twist in its fitting position relative to the cylinder head, which means, for example, the electric cable connections for actuating the fuel injector and the fuel distributor line flange-mounted on the fuel injector may be damaged. The subsequent malfunctions may lead to damage to the fuel injector, as well as the entire internal combustion engine.

SUMMARY OF THE INVENTION

In accordance with an example embodiment of the present invention, an alignment element, connectable to a fuel injector by catching via a plug, for a fuel injector is provided which may fix the fuel injector in position in such a manner that rotation of the fuel injector in its fitting position is prevented, and therefore no damage may occur as a result of sheared-off cable or distributor lines.

The alignment element may be provided with a tab which is clamped as a lever arm for reliable securing between the fuel injector and, for example, a mandrel of a fixing device. The mandrel may also penetrate the tab through an opening.

The alignment element may be produced in one piece from sheet metal by punching and bending, which means it exhibits good elasticity properties that are necessary for engaging with the fuel injector.

The alignment element may be mounted without additional components between the fuel injector and the mandrel of the fixing device.

BRIEF DESCRIPTION OF THE DRAWINGS

FIG. 1 shows a schematic partial section through a fuel injector fixed in position in a cylinder head of an internal combustion engine by an example embodiment of an alignment element according to the present invention.

FIG. 2 shows a schematic top view of the example embodiment of an alignment element according to the present invention shown in FIG. 1, with a first securing possibility.

FIG. 3 shows a cut-away portion from FIG. 2 of the example embodiment of an alignment element, according to the present invention, with a second securing possibility.

DETAILED DESCRIPTION

FIG. 1 shows a schematic partial section through a fuel injector 1, which is locked against rotation in a cylinder head 2 of an internal combustion engine by an alignment element 8 according to an example embodiment of the present invention.

In this context, a fuel injector 1 is configured in the form of a direct-injection fuel injector 1, which is installed in a cylinder head 2 for the direct injection of fuel into a combustion chamber of a mixture-compressing internal combustion engine (not shown further) having externally supplied ignition. At an end 3 on the inlet side, fuel injector 1 is provided with a plug connection to a fuel distributor line (not shown), which is sealed by a seal 4 between the fuel distributor line and a supply line connection 5 of fuel injector 1. Fuel injector 1 includes an electrical connection 6 for the electrical contacting to actuate fuel injector 1. Fuel injector 1, at least in its part projecting above cylinder head 2, is provided with a plastic coating 9 that also surrounds electrical connection 6.

In order to lock fuel injector 1, fixed in position in a receiving bore hole 7 of cylinder head 2 by a fixing device, e.g., a clamping shoe (not further shown), against rotation, an alignment element 8 is provided. Alignment element 8 is made of a ring 10 which, in the example embodiment, includes at least one plug 11 used for fixing ring 10 to plastic coating 9. The at least one plug 11 engages in a corresponding recess 12 of plastic coating 9, whereby ring 10, slipped onto fuel injector 1, is detachably joined to it.

A tab 13, formed on ring 10, extends parallel to the surface of cylinder head 2 to a structure, suitable as an abutment (counter-support), which is securely joined to cylinder head 2. In the example embodiment, it is a mandrel 15 of the fixing device (not further shown), which, for example, may be configured in the form of a clamping shoe. In this context, tab 13 acts as a lever arm which permits reliable locking of fuel injector 1 against rotation in its fitting position in cylinder head 2.

Additionally, the at least one plug 11 may be arranged asymmetrically in relation to the position of tab 13 on the periphery of ring 10, so that the mounting position of alignment element 8 is clearly defined. This measure is apparent from the top view of alignment element 8 in FIG. 2, in which ring 10 is shown with tab 13 extending radially outwardly. It may thereby be ensured that alignment element 8 is slipped onto fuel injector 1 in the correct orientation during assembly.

In addition, to avoid slipping off from mandrel 15 used as an abutment, tab 13 is configured asymmetrically at an end 14 facing away from ring 10, so that it may not drift between mandrel 15 and fuel injector 1. This may be achieved, for example, by a contour of end 14 of tab 13 partially encompassing mandrel 15. Thus, after plug 11 has snapped into recess 12 on fuel injector 1, and end 14 of tab 13 has locked into place on mandrel 15, with insignificant tolerances, fuel injector 1 is prevented from rotating, which means cable and line connections attached to fuel injector 1 are no longer exposed to the danger of shearing off.

Alignment element 8 may be fastened directly on cylinder head 2, for example, also using mandrel 15 by screwing it through a corresponding opening 16 in the tab into cylinder head 2, as shown in part in FIG. 3. To mount alignment element 8, it is first of all slipped onto fuel injector 1, which is then mounted in cylinder head 2, and mandrel 15 of the clamping shoe is subsequently screwed into cylinder head 2 through opening 16, so that fuel injector 1 is secured and locked against rotation simultaneously.

The present invention is not limited to the example embodiment shown, and is also applicable, for example, to fuel injectors 1 for injection into the combustion chamber of a self-ignition internal combustion engine.

What is claimed is:

1. An alignment element for securing a fuel injector for direct injection of a fuel into a combustion chamber of an internal combustion engine to a cylinder head of the internal combustion engine, the alignment element comprising:

a ring slipped onto the fuel injector; and at least one plug arranged on the ring which is arranged so that the at least one plug snaps into a recess in a plastic coating of the fuel injector.

2. The alignment element of claim 1, wherein the recess is formed in a region of an electrical connection of the fuel injector.

3. The alignment element of claim 1, wherein a tab formed as a flat structural element is arranged on the ring.

4. The alignment element of claim 3, wherein the tab, with an end facing away from the ring, abuts against a mandrel of a fixing device, the mandrel functioning as an abutment.

5. The alignment element of claim 4, wherein the end facing away from the ring at least partially encompasses the mandrel.

6. The alignment element of claim 3, wherein the at least one plug and the tab are arranged asymmetrically with reference to a periphery of the ring.

7. The alignment element of claim 4, wherein the tab is penetrated by the mandrel through an opening.

8. The alignment element of claim 3, wherein the ring is formed in one piece with the tab.

9. The alignment element of claim 1, wherein the alignment element is produced from a sheet metal by punching and bending.

10. The alignment element of claim 3, wherein the tab is joined to the ring by one of welding or soldering.

* * * * *